(12) United States Patent
Huang et al.

(10) Patent No.: US 9,256,754 B2
(45) Date of Patent: Feb. 9, 2016

(54) DATA PROTECTION METHOD AND ELECTRONIC DEVICE CAPABLE OF CREATING A PRIVATE FOLDER HAVING A SAME NAME AS A PUBLIC FOLDER TO HIDE PRIVATE DATA

(71) Applicant: Wistron Corporation, New Taipei (TW)

(72) Inventors: Qian Huang, New Taipei (TW); Chun-Ming Lin, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 64 days.

(21) Appl. No.: 13/900,562

(22) Filed: May 23, 2013

(65) Prior Publication Data

US 2014/0109241 A1  Apr. 17, 2014

(30) Foreign Application Priority Data

Oct. 16, 2012 (CN) .......................... 2012 1 0392416

(51) Int. Cl.
*G06F 21/44* (2013.01)
*G06F 21/62* (2013.01)

(52) U.S. Cl.
CPC ........ *G06F 21/6209* (2013.01); *G06F 21/6218* (2013.01); *G06F 21/6245* (2013.01)

(58) Field of Classification Search
CPC ........... G06F 21/6209; G06F 21/6245; G06F 17/30067; H04L 9/3226
USPC .......................................................... 726/28
See application file for complete search history.

(56) References Cited

U.S. PATENT DOCUMENTS

| 8,359,659 B2 * | 1/2013 | Sim ..................... G06F 21/6245 713/166 |
| 2004/0143765 A1 * | 7/2004 | Kazawa et al. ............... 713/202 |
| 2006/0294599 A1 * | 12/2006 | Sim et al. ......................... 726/34 |
| 2007/0097421 A1 * | 5/2007 | Sorensen et al. ............. 358/1.15 |
| 2008/0109908 A1 * | 5/2008 | Havens et al. .................. 726/27 |
| 2012/0151012 A1 * | 6/2012 | Mustafa ........................ 709/219 |
| 2012/0226912 A1 * | 9/2012 | King ............................. 713/183 |

FOREIGN PATENT DOCUMENTS

TW  1380192  12/2012

* cited by examiner

*Primary Examiner* — Izunna Okeke
*Assistant Examiner* — Bryan Wright
(74) *Attorney, Agent, or Firm* — Winston Hsu; Scott Margo

(57) ABSTRACT

A data protection method for an electronic device is disclosed. The data protection method includes setting a log-in password for a private file stored in a public folder, creating a private folder having a same folder name as the public folder to store the private file in the private folder, and comparing an input password with the log-in password for the private folder to determine to display the private folder or the public folder.

6 Claims, 8 Drawing Sheets

DATA PROTECTION METHOD AND ELECTRONIC DEVICE CAPABLE OF CREATING A PRIVATE FOLDER HAVING A SAME NAME AS A PUBLIC FOLDER TO HIDE PRIVATE DATA

BACKGROUND OF THE INVENTION

1. Field of the Invention

The present invention relates to a data protection method and electronic device, and more particularly, to a data protection method and electronic device capable of creating a private folder having a same name as a public folder to hide private data without other people's knowledge.

2. Description of the Prior Art

A portable mobile device, e.g. a smart phone or a tablet computer, usually stores a user's private data such as messages, photos or mails, and the user may not be willing to allow the private data to be seen by other people, even family and friends.

To protect the private data from being seen by other people, a traditional method is to utilize specific software tools to individually lock a private file, and the user has to enter a correct password to read the private data of the private file. However, such method tells other people of an existence of the private data, which may cause the private data to be more easily accessed by other people as well as arousing unnecessary suspicions.

Therefore, how to hide the private data without other people s knowledge has become one of the topics to be solved in the industry.

SUMMARY OF THE INVENTION

It is therefore an object of the present invention to provide a data protection method and electronic device capable of creating a private folder having a same folder name as a public folder to hide private data without other people's knowledge.

The present invention discloses a data protection method for an electronic device, comprising setting a log-in password for a private file stored in a public folder, creating a private folder having a same folder name as the public folder to store the private file in the private folder, and comparing an input password with the log-in password for the private folder to determine whether to display the private folder or the public folder.

The present invention further discloses an electronic device, comprising a processor, a display coupled to the processor for displaying an operation of the processor, and a storage coupled to the processor for storing a program code to instruct the processor executing a data protection method, wherein the data protection method comprises setting a log-in password for a private file stored in a public folder, creating a private folder having a same folder name as the public folder to store the private file in the private folder, and comparing an input password with the log-in password for the private folder to determine whether to display the private folder or the public folder.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
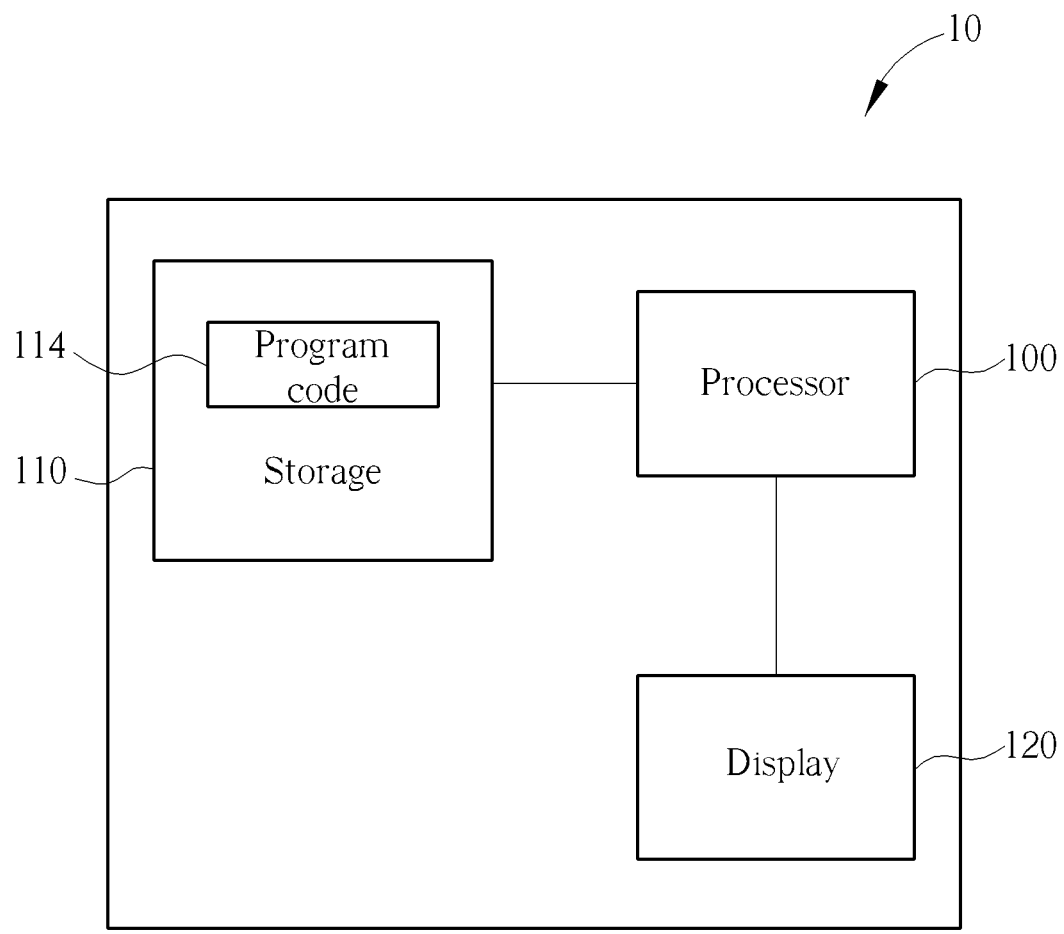
FIG. 1 is a schematic diagram of an electronic device according to an embodiment of the present invention.

Please refer to FIG. 1, which is a schematic diagram of an electronic device 10 according to an embodiment of the present invention. The electronic device 10 may be, inter alia, a smart phone, a tablet computer, a personal digital assistant or a notebook computer. The electronic device 10 includes a processor 100, a storage 110 and a display 120. The processor 100 is coupled to the storage 110 and the display 120, the processor 100 may be such as a microprocessor or an application-specific integrated circuit (ASIC). The storage 110 may be any data storage device for storing the program code 114 for the processor 100 to access. For example, the storage unit 210 may be a subscriber identity module (SIM), a read-only memory (ROM), a random-access memory (RAM), CD-ROMs, magnetic tapes, a hard disk or optical data storage device, and not limited to the mentioned storage devices. The display 120 may be a liquid crystal display for displaying an operation of the processor 100.

Figure 2:
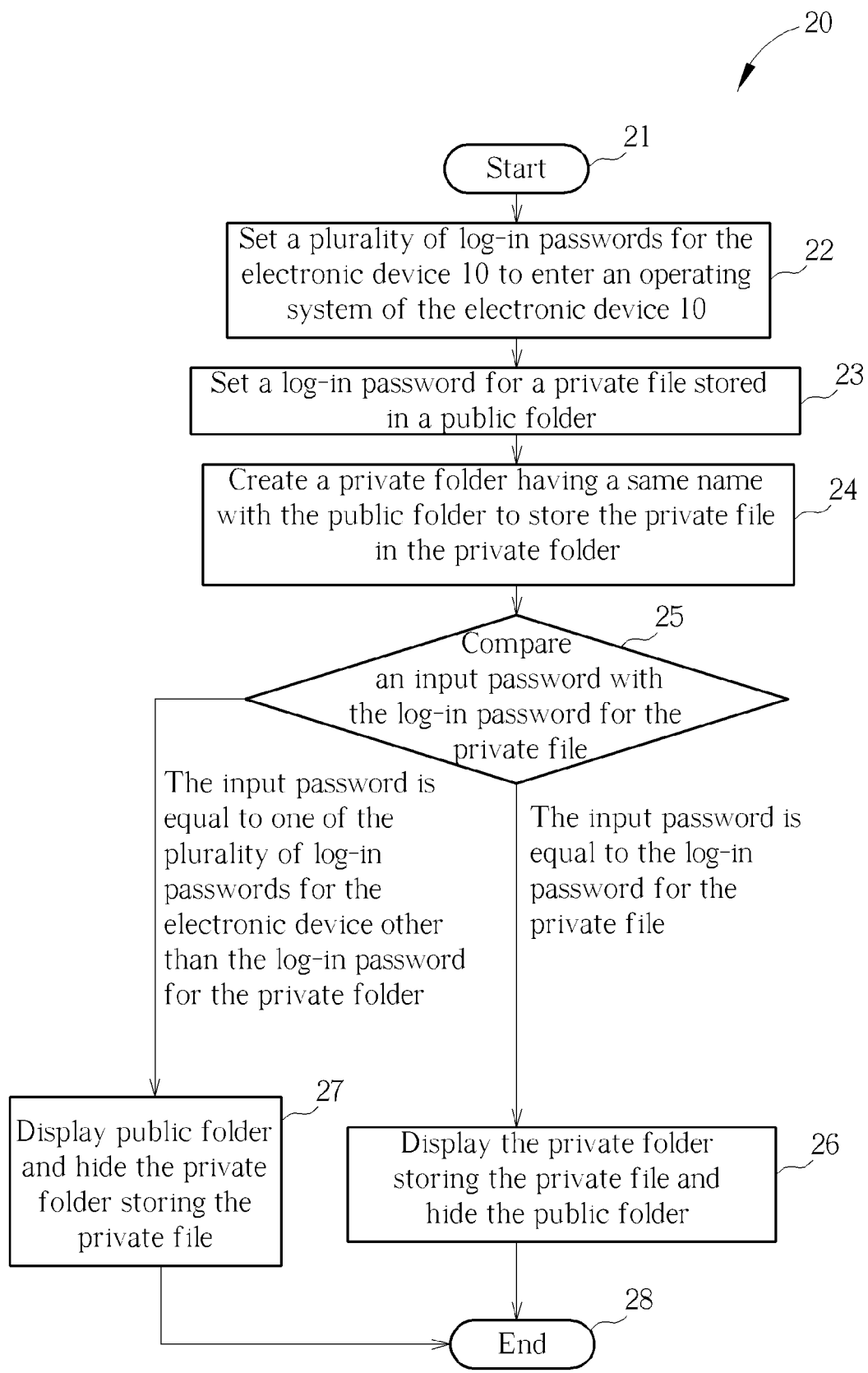
FIG. 2 is a schematic diagram of a data protection process according to an embodiment of the present invention.

Please refer to FIG. 2, which is a schematic diagram of a data protection process 20 according to an embodiment of the present invention. The data protection process 20 may be used in the electronic device 10 for hiding private data without other people's knowledge. The data protection process 20 may be compiled into the program code 114 and includes the following steps:

Step 21: Start.

Step 22: Set a plurality of log-in passwords for the electronic device 10 to enter an operating system of the electronic device 10.

Step 23: Set a log-in password for a private file stored in a public folder.

Step 24: Create a private folder having a same name with the public folder to store the private file in the private folder.

Step 25: Compare an input password with the log-in password for the private file. Go to Step 26 when the input password is equal to the log-in password for the private file. Go to Step 27 when the input password is equal to one of the plurality of log-in passwords for the electronic device other than the log-in password for the private folder.

Step 26: Display the private folder storing the private file and hide the public folder. End.

Step 27: Display public folder and hide the private folder storing the private file.

Step 28: End.

Please refer to FIG. 3 to FIG. 8 for specific operations of the data protection process 20. FIG. 3 to FIG. 8 are schematic diagrams illustrating step by step screens displayed by the display 120 of the electronic device 10 according to the data protection process 20.

Figure 3:
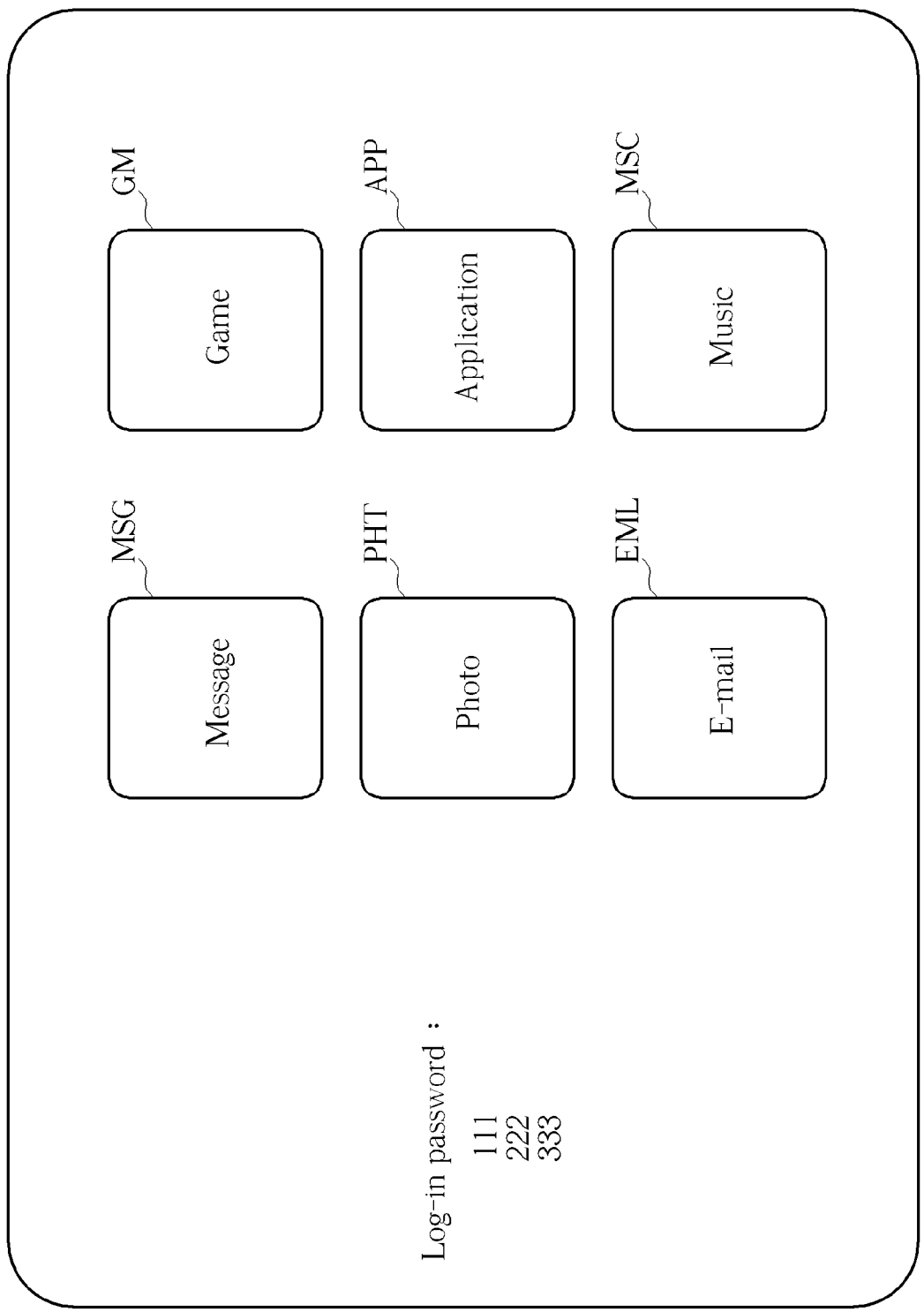
FIG. 3 to FIG. 8 are schematic diagrams illustrating step by step screens displayed by the display of the electronic device shown in FIG. 1 according to the data protection process shown in FIG. 2.

According to Step 22 and FIG. 3, the user may set three log-in passwords for the electronic device 10, which are 111, 222 and 333. The operating system of the electronic device 10 may be entered as long as one of the three log-in passwords is inputted. After the operating system is entered, folders in the operating system are defaulted as public folders before the private file is set, and data or files of the public folder may be displayed or read freely. For example, the display 120 may display the public folders including a message folder MSG, a photo folder PHT, a mail folder EML, a game folder GM, an application folder APP and a music folder MSC.

Figure 4:
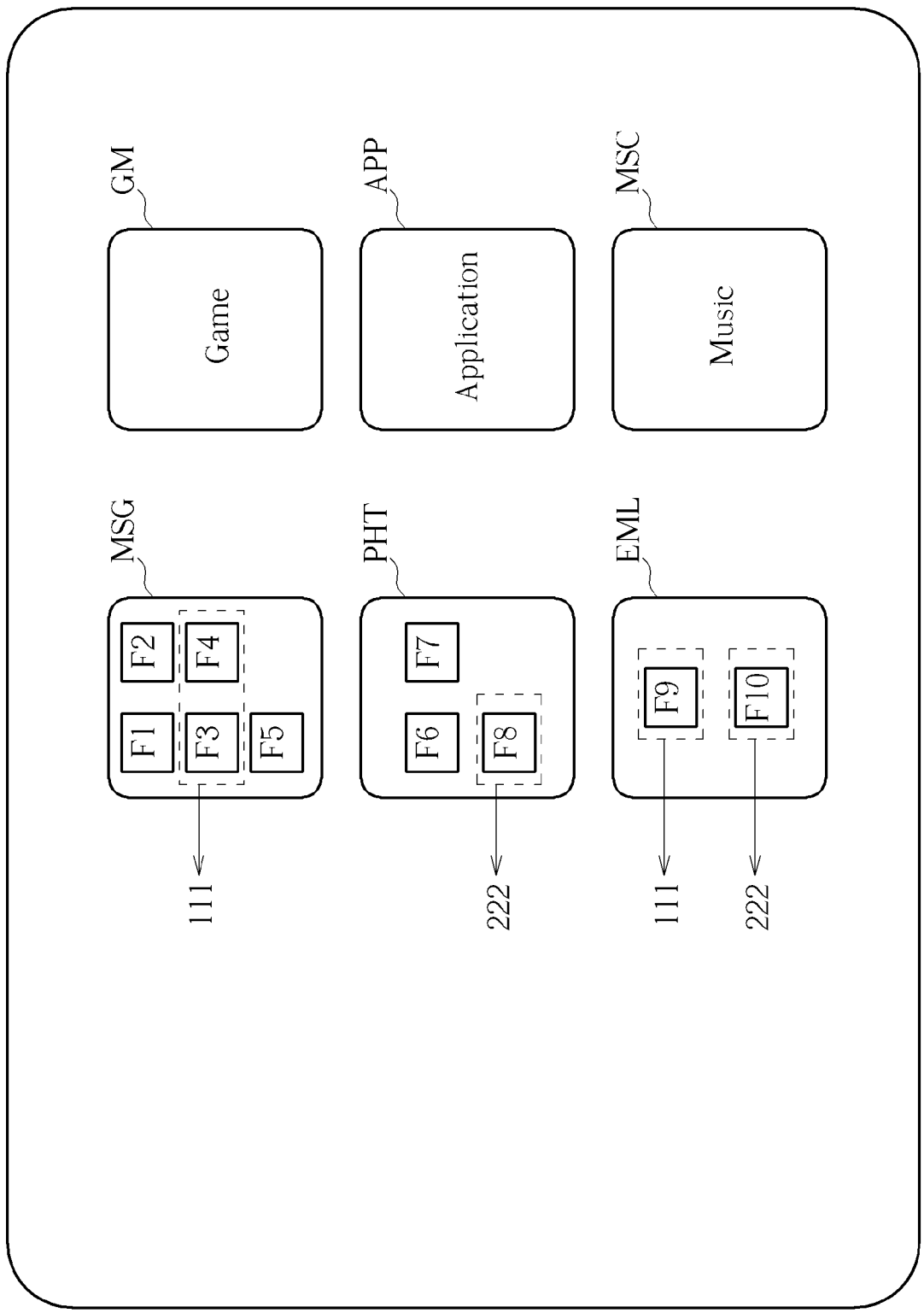

According to Step 23 and FIG. 4, if the user desires to set passwords to protect some files stored in the public folders, the user may select the file being protected and set its log-in password, so as to individually hide or display the private file, wherein the log-in password for the private file should be one of the three log-in passwords for the electronic device 10. For example, the message folder MSG includes files F1-F5, the user may select the file F3 and the file F4 for being protected and set the log-in password for the files F3 and F4 to be 111. The photo folder PHT includes files F6-F8, the user may select the file F8 for being protected and set the log-in password for the file F8 to be 222. The mail folder EML includes files F9 and F10, the user may select the file F9 and set the log-in password for the file F9 to be 111, and set the log-in password for the file F10 to be 222.

Noticeably, to broaden a flexibility of the present invention, there may be different ways to set the log-in password. As shown in FIG. 4, different log-in passwords may be respectively set to different folders, e.g. the log-in password for the message folder MSG is 111, the log-in password for the photo folder PHT is 222. In another case, different private files stored in the same folder may be set with different log-in passwords, e.g. the log-in passwords for the files F9 and F10 both stored in the mail folder EML are 111 and 222, respectively.

Figure 5:
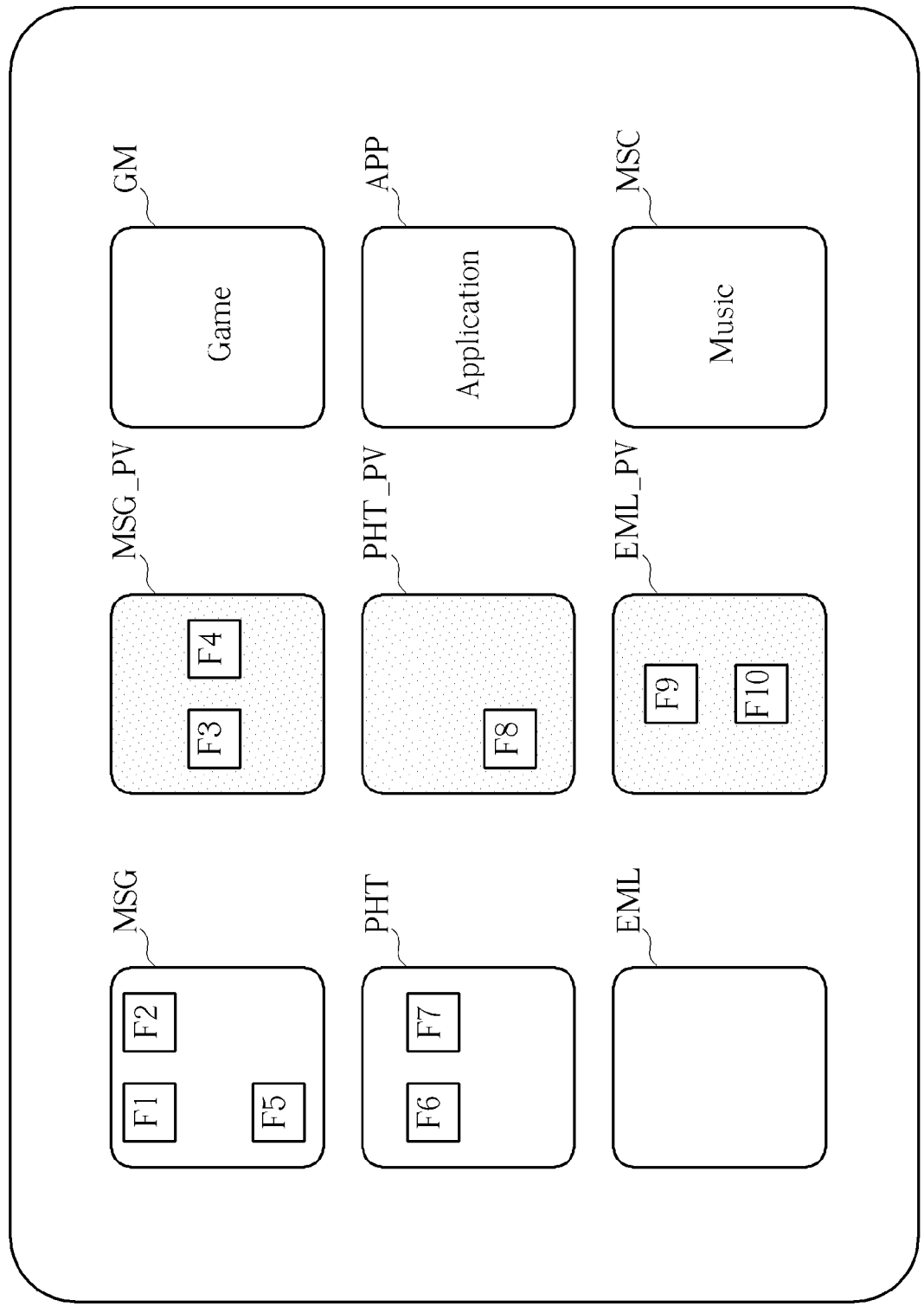

According to Step 24 and FIG. 5, after the log-in passwords for the private files F3, F4, F8, F9 and F10 are set, the processor 100 may create a private folder having a same name as the public folder to store the private file correspondingly. For example, a private message folder MSG_PV may be created to store the private files F3 and F4. A private photo folder PHT_PV may be created to store the private file F8. A private mail folder EML_PV may be created to store the private files F9 and F10. The public files F1, F2 and F5 are stored in the public message folder MSG. The public files F6 and F7 are stored in the public photo folder PHT. The processor does not create corresponding private folders for the rest of public folders since there is no private file stored in the public folders, i.e. the game folder GM, the application folder APP and the music folder MSC, in which files and data may be read and displayed once the operating system is entered successfully.

Figure 6:
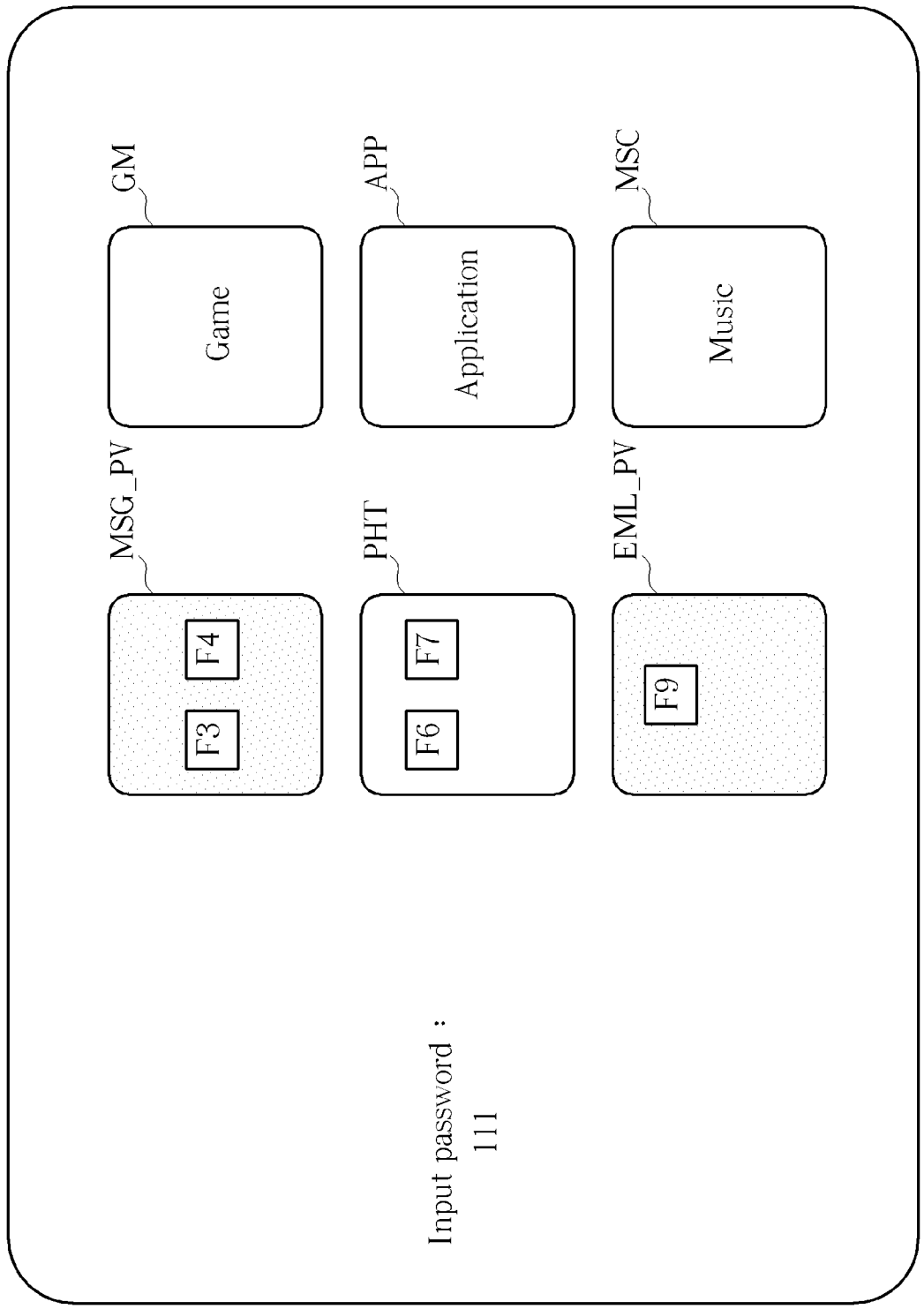

According to Steps 25, 26 and 27, as shown in FIG. 6, if the user inputs the input password 111, the display 120 may display the private message folder MSG_PV storing the private files F3 and F4, display the private mail folder EML_PV storing the private file F9, and hide the public message folder MSG storing the public files F1, F2 and F5. Meanwhile, since the input password 111 is not equal to the log-in password 222 for the private files F8 and F10, the display 120 may hide the private photo folder PHT_PV storing the private file F8, hide the private file F10, and display the public photo folder PHT storing the public files F6 and F7.

Figure 7:
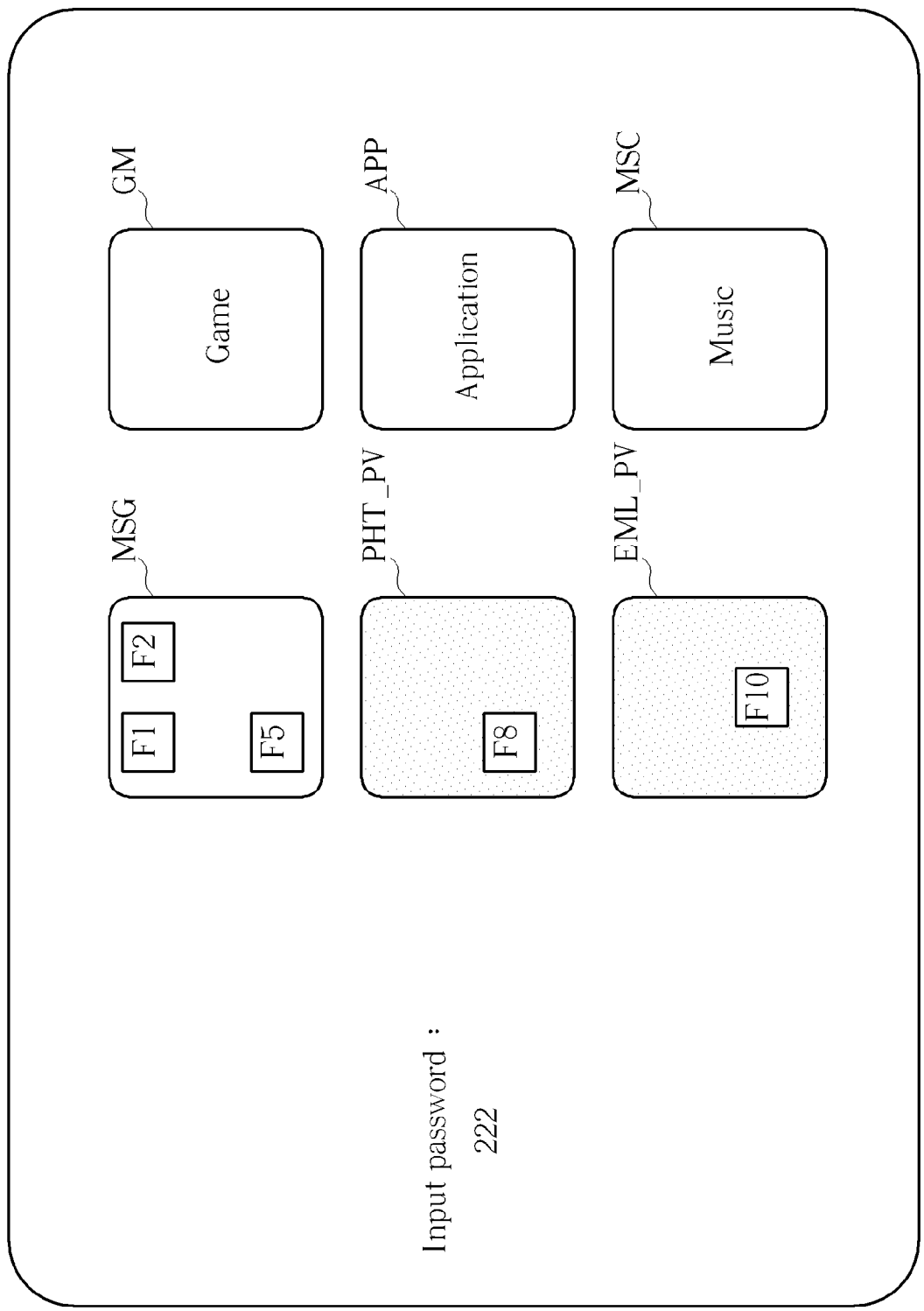

As shown in FIG. 7, if the user inputs the input password 222, the display 120 may display the private photo folder PHT_PV storing the private file F8, display the private mail folder EML_PV storing the private file F10, and hide the public photo folder PHT storing the public files F6 and F7. Meanwhile, since the input password 222 is not equal to the log-in password 111 for the private files F3, F4 and F9, the display 120 may hide the private message folder MSG_PV storing the private files F3 and F4, hide the private file F9, and display the public message folder MSG storing the public files F1, F2 and F5.

Figure 8:
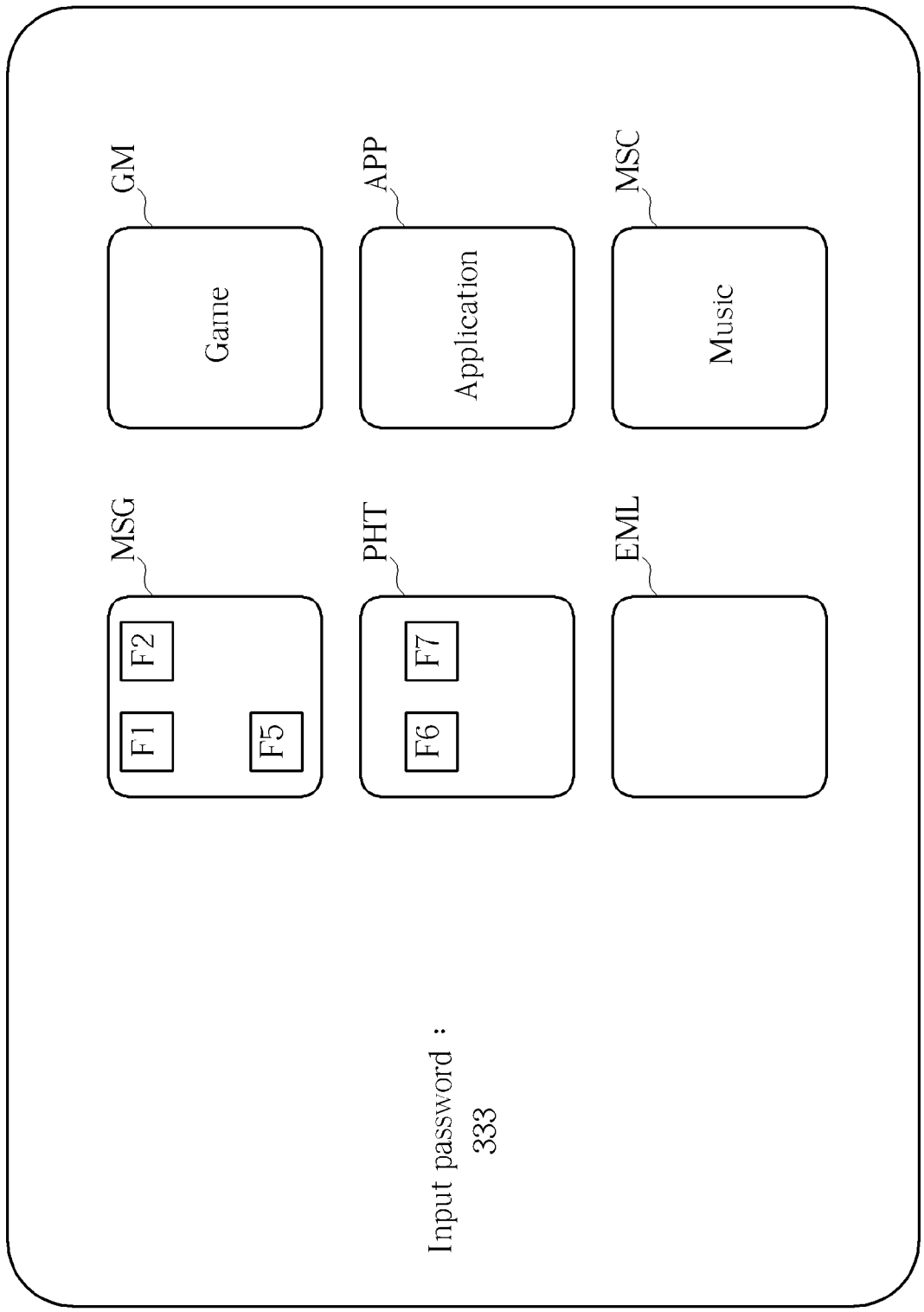

As shown in FIG. 8, if the user inputs the input password 333, which is not equal to the log-in password 111 for the private files F3 and F4, and not equal to the log-in password 222 for the private files F8, F9 and F10. In other words, the input password 333 is one of the three log-in passwords for the electronic device 10 other than the log-in password for the private files. The display 120 may display the public message folder MSG storing the public files F1, F2 and F5, display the public photo folder PHT storing the public files F6 and F7, display the public mail folder EML, hide the private message folder MSG_PV storing the private files F3 and F4, hide the private photo folder PHT_PV storing the private file F8, and hide the private mail folder EML_PV storing the private files F9 and F10.

In short, the data protection process of the present invention may be regarded as setting a plurality of log-in passwords for a same log-in account, i.e. an owner of the electronic device, to control display permissions for different files. Besides, since the folder storing the public file and the folder storing the private file have the same folder name but different properties, no matter which one of the log-in passwords is inputted, other people may not be aware whether the folder currently displayed includes encrypted private data or public date.

To sum up, the present invention may set the log-in password for the private file and create the private folder having the same folder name but different property as the public folder, so as to store the private file. Thus, the owner of the electronic device may input different log-in passwords to enter the operating system and control which files to be displayed or hidden at the same time. Since the public folder and the private folder have the same folder name and only one of the public folder and the private folder is displayed, even the people close to the owner may not be easily aware that a file category currently displayed by the electronic device includes the encrypted private data. In such a data protection method, the private file may be encrypted without other people's knowledge and prevent unnecessary suspicion.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data protection method for an electronic device, comprising:
setting a first log-in password for a plurality of public folders;
setting a second log-in password for a private file stored in a first public folder of the plurality of public folders;
creating a private folder having a same folder name as the first public folder to store the private file in the private folder; and
comparing an input password with the first and second log-in passwords to determine to display either the private folder or the public folder having the same folder name, comprising:
displaying the private folder storing the private file and the plurality of public folders except the first public folder having the same folder name as the private folder when the input password is equal to the second log-in password; and
displaying the plurality of public folders and hiding the private folder storing the private file when the input password is equal to the first log-in password.

2. The data protection method of claim 1, wherein the second log-in password for the private file is one of the plurality of log-in passwords for the electronic device.

3. An electronic device, comprising:

a processor;

a display coupled to the processor for displaying an operation of the processor; and a storage coupled to the processor for storing a program code to instruct the processor executing a data protection method, wherein the data protection method comprises:

setting a first log-in password for a plurality of public folders;

setting a second log-in password for a private file stored in a first public folder of the plurality of public folders;

creating a private folder having a same folder name as the first public folder to store the private file in the private folder; and comparing an input password with the first and second log-in passwords to determine to display either the private folder or the public folder having the same folder name, comprising:

displaying the private folder storing the private file and the plurality of public folders except the first public folder having the same folder name as the private folder when the input password is equal to the second log-in password; and displaying the plurality of public folders and hiding the private folder storing the private file when the input password is equal to the first log-in password.

4. The electronic device of claim 3, wherein the second log-in password for the private file is one of the plurality of log-in passwords for the electronic device.

5. The data protection method of claim 1, further comprising: setting a plurality of log-in passwords for the electronic device to enter an operating system of the electronic device.

6. The electronic device of claim 3, the data protection method further comprises: setting a plurality of log-in passwords for the electronic device to enter an operating system of the electronic device.

* * * * *